(12) United States Patent
Blakstad Poolsaar et al.

(10) Patent No.: US 8,494,483 B2
(45) Date of Patent: Jul. 23, 2013

(54) METHOD AND ARRANGEMENT FOR PROVIDING TELECOMMUNICATION SERVICES

(75) Inventors: Birgitta Blakstad Poolsaar, Tyresö (SE); Bengt Wattenström, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 615 days.

(21) Appl. No.: 11/381,165

(22) Filed: May 2, 2006

(65) Prior Publication Data
US 2007/0259664 A1 Nov. 8, 2007

(51) Int. Cl.
*H04M 11/00* (2006.01)
(52) U.S. Cl.
USPC ........ 455/405; 455/407; 455/409; 455/432.1; 455/435.2
(58) Field of Classification Search
USPC ................ 455/405, 406, 409, 432.1, 435.2
See application file for complete search history.

(56) References Cited

U.S. PATENT DOCUMENTS

| | | | | |
|---|---|---|---|---|
| 5,260,987 A | * | 11/1993 | Mauger | 455/560 |
| 5,537,610 A | * | 7/1996 | Mauger et al. | 455/435.3 |
| 7,295,119 B2 | * | 11/2007 | Rappaport et al. | 340/572.4 |
| 2003/0134614 A1 | * | 7/2003 | Dye | 455/406 |
| 2003/0154136 A1 | * | 8/2003 | Bittmann et al. | 705/26 |
| 2003/0224781 A1 | * | 12/2003 | Milford et al. | 455/426.1 |
| 2004/0029587 A1 | * | 2/2004 | Hulkkonen et al. | 455/436 |
| 2005/0197120 A1 | * | 9/2005 | Kuchibhotla et al. | 455/435.1 |
| 2006/0073831 A1 | * | 4/2006 | Guyot et al. | 455/443 |
| 2006/0083205 A1 | * | 4/2006 | Buddhikot et al. | 370/338 |
| 2007/0083628 A1 | * | 4/2007 | Sandstrom | 709/223 |
| 2007/0203880 A1 | * | 8/2007 | Kumar et al. | 707/1 |
| 2009/0213834 A1 | * | 8/2009 | Amirijoo et al. | 370/352 |
| 2010/0330957 A1 | * | 12/2010 | Harada et al. | 455/406 |

FOREIGN PATENT DOCUMENTS

| | | | |
|---|---|---|---|
| EP | 1443790 | * | 8/2004 |
| EP | 1443790 A1 | * | 8/2004 |
| WO | WO 02/073993 | * | 9/2002 |
| WO | WO 02/073993 | * | 9/2003 |

OTHER PUBLICATIONS

Chinese Office Action, dated Dec. 14, 2010, in connection with Chinese Patent Application No. 200680054446.6 (See Foreign Associate's English-language description and Assignee-provided translation of Chinese Office Action below).
Foreign Associate's English-language description of Chinese Office Action, dated Dec. 14, 2010, in connection with Chinese Patent Application No. 200680054446.6.
Assignee-provided translation of Chinese Office Action, dated Dec. 14, 2010, in connection with Chinese Patent Application No. 200680054446.6.

* cited by examiner

*Primary Examiner* — Lester Kincaid
*Assistant Examiner* — Mehmood B Khan
(74) *Attorney, Agent, or Firm* — Potomac Patent Group PLLC

(57) ABSTRACT

A method and arrangement for providing telecommunication services for subscribers of multiple different operators, using a single communication network controlled by an operator-independent network supervisor. Resources in said network for technically providing telecommunication services can be hired by said operators for serving their subscribers. The operators are then charged for consumed network resources, preferably on the basis of communicated data amounts, used bandwidth, and/or connection time. In this way, only one communication network is needed for offering services from multiple operators in a certain region, and unnecessary duplication of network resources can be avoided.

16 Claims, 2 Drawing Sheets

METHOD AND ARRANGEMENT FOR PROVIDING TELECOMMUNICATION SERVICES

TECHNICAL FIELD

The present invention relates generally to a method and arrangement for providing telecommunication services for subscribers. In particular, the present invention handles resources in a communication network and can be utilized in mainly rural areas using mobile or cellular networks.

BACKGROUND

Different networks for providing communication services involving voice and/or data have been widely employed around the world, at least in the civilised or "industrial" parts. In the first place, dense areas such as cities, main highways and public areas in general with relatively high demands for communication, have obtained coverage by the establishment of network infrastructures, particularly for mobile communication.

Gradually, the network infrastructures have further expanded over the years to also cover some less crowded areas, referred to as "rural". The incentive for building communication networks in such areas naturally depends on the demands and potential market for services versus the costs for obtaining coverage. Since the less crowded areas are typically also geographically large, a point is eventually reached when the market potential is too small to motivate the costs for building and operating a network with such large geographical coverage. Therefore, a complete coverage is not motivated, and this problem is particularly accentuated in poor rural regions of the world where people live in very primitive circumstances, having very little means to spend on telecommunication.

It is estimated that more than two thirds of the world population today have no access to either voice or data communication by living in such non-covered areas, e.g. in so-called developing countries. Obviously, these regions have an enormous future market potential if only the necessary investments could be made for establishing network coverage, with at least rudimentary services such as mobile communication of voice and short messages, and for teaching the inhabitants how to use communication equipment.

When multiple network operators are active basically in the same region, it has been common practice for them to establish and manage their own networks "in parallel" typically using their own proprietary equipment, services and functionality, although mostly based on standardised products and protocols. Thus, each operator is responsible for maintaining an entire network, more or less, albeit sometimes sharing certain basic equipment such as communication links, power supply, cabinets and antenna towers. In this way, each operator has full control of its services and resources, their coverage areas usually at least partly overlapping geographically, but must also alone bear its costs. An example of this situation is illustrated in FIG. 1, where three operators A, B and C (denoted as 100A, 100B and 100C) handle separate mobile networks 102A, 102B and 102C, respectively, serving subscribers 104 with mobile services. It should be noted that the geographical coverage of networks 102A, 102B and 102C are typically overlapping in the main.

However, it is a problem that huge investments in equipment as well as human resources are required for establishing a communication network in order to even begin serving a new region with various communication services. For example, a mobile network requires the installation of base stations with antennas, towers, transceivers, amplifiers, cooling equipment, etc., as well as switching and control nodes, cable links, routers, gateways, processors, databases, etc. Considerable work is also required to plan, test and tune the network, necessary to optimise its capacity and avoid interference, among other things. After installation, further expenses must go to operation and maintenance of the network. In addition, the political, legal and social situation in developing countries is often generally instable and difficult to assess.

Consequently, due to the considerable economical risk associated with such investments, network operators are inclined to avoid establishment in untapped markets of poor areas where the cost threshold is too high considering the initially weak market potential and general insecurity. Thus, it is desirable to reduce the economical risk and initial investment threshold for operators. It is also highly desirable to introduce at least rudimentary communication services to people living under primitive circumstances, in order to generally increase their quality of life.

In an overall perspective, the business of providing communication services should be profitable for all concerned, in order to create a sustainable economic growth in poor regions around the world. Once basic communication services becomes available, the economy growth will be facilitated and the demands for further capacity, coverage and functionality will gradually increase resulting in further growth, and so forth. A significant problem is therefore to overcome the initial hurdles and costs for operators to be able to start providing their services in areas lacking an infrastructure for telecommunication.

SUMMARY

The object of the present invention is to address at least some of the problems outlined above. In particular, it is an object to provide a solution that can reduce the impediments and entry hurdles for network operators to start providing services involving communication of voice and/or data.

These objects and others can be achieved primarily by a solution according to the appended independent claims. According to some aspects, a method and an apparatus are defined for providing telecommunication services for subscribers of multiple different operators, using a single communication network controlled by an operator-independent network supervisor. The operators handle subscriptions and sell the services, whereas the network supervisor provides the services technically.

When receiving a service request from a subscriber, the operator which the subscriber belongs to is identified. Network resources needed for the requested service are assigned, and the requested service is delivered using the assigned network resources. Further, the amount of network resources consumed is determined after completing the service delivery, and the identified operator of the subscriber is finally charged for the network resources consumed during service delivery.

The operators are preferably charged for consumed network resources on the basis of communicated data amounts, used bandwidth, and/or connection time.

Call records or the like may also be supplied to the operators, containing information on how much each subscriber has consumed in terms of communicated data amounts and/or connection time.

According to other aspects, a method and an arrangement are defined for controlling a communication network by an operator-independent network supervisor, in order to provide telecommunication services to subscribers of multiple different operators, said operators handling subscriptions and selling the services, and said network supervisor providing the services technically. Resources in the network needed for requested services can be hired out to the operators in order to serve their subscribers. The operators are then charged for any consumed network resources.

In this way, only a single communication network is needed for offering services from multiple operators in a certain region, and unnecessary duplication of network resources can be avoided. Further features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
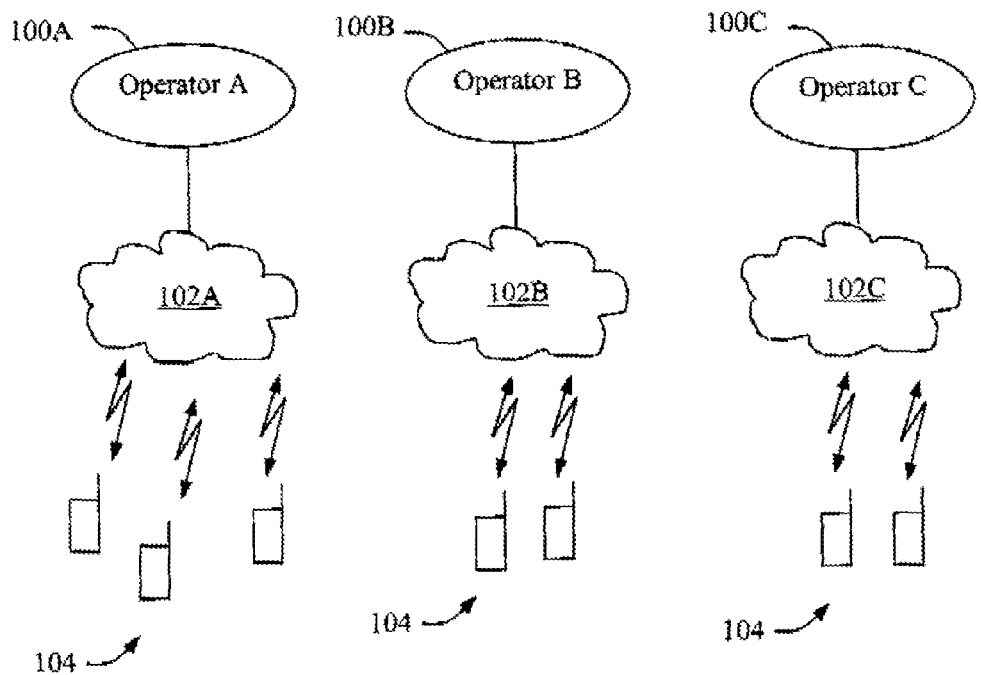
FIG. 1 is a basic overview of a communication scenario, according to the prior art.

Briefly described, the present invention provides a solution where plural operators can hire network resources on demand in a single communication network from an operator-independent "network supervisor" controlling said network. Although the term network supervisor will be used throughout the following description, other suitable terms could be "network manager" or "network owner", etc.

In this solution, the network controlled by the network supervisor can be utilised by all operators active in the region covered by the network. The network supervisor may then establish and handle all network resources needed, including installation and maintenance of various components such as, in the case of a mobile network, base station equipment, transmission links, and switching and control nodes. Moreover, the network supervisor may also provide any human resources necessary to keep the network up and running. The network supervisor will also obtain and hold a license or permit from the local authorities for radio transmission in a certain frequency spectrum.

The operators will in turn handle their user subscriptions including individual subscriber billing and the marketing and sales of a selection of services. In poor rural regions, these services should primarily involve the communication of voice and short text messages, e.g. mobile communication using the GSM (Global Systems for Mobile communication) standard. However, other services are naturally also possible such as content delivery, multimedia and Internet applications. Pre-paid or post-paid subscriptions may be employed.

Thus, the network supervisor charges the operators for any used network resources preferably on the basis of communicated data amounts, used bandwidth and/or connection time, i.e. depending on the amount of traffic. In this way, only one communication network is needed for offering telecommunication services from multiple operators, and unnecessary duplication of network components and resources can be effectively avoided. Further benefits and advantages will become evident below.

In a suitable business arrangement, the network supervisor basically owns the network, e.g. financed by different stake holders and enterprises such as commercial banks, financial institutions, local investors, charity institutions, etc. The operators need not make huge investments in the network itself but can hire various needed network resources from the network supervisor, basically on demand from their subscribers, and preferably on a call basis. In this financial solution, the economical risks will be shared between the stakeholders and operators involved. Thereby, the hurdles and economical risks for commencing the business of providing telecommunication services to subscribers are significantly reduced for each operator, and it becomes more attractive to establish an operator enterprise in the region. Even though a single network is employed, a healthy competition situation can also come in force by having multiple operators which may further specialize in specific types of services and/or subscriptions.

The inventive procedure and arrangement for providing telecommunication services by means of a single network will now be described by means of an overview scenario illustrated in FIG. 2, in the case of a mobile network. For example, the mobile network may use some well-known standard such as GSM, GPRS (General Packet Radio Service) or WCDMA (Wideband Code Division Multiple Access). However, it should be noted that the present solution is not limited to mobile or cellular networks but can be used for other types of networks for telecommunication as well, including fixed broadband access networks, WLAN (Wireless Local Area Network), PSTN (Public Switched Telephony Network), etc.

In this example, three mobile operators A, B and C (denoted as 200A, 200B and 200C, although there may be any other number of operators present) hire network resources in a mobile network 200 that is controlled by an operator-independent network supervisor 204. In this context, "controlling" the network 202 should be understood as managing the different physical and human resources needed to technically provide telecommunication services in general, which may include any hardware and software equipment as well as humans.

In the situation shown in this figure, mobile operator A utilises certain network resources, schematically denoted 202A, currently needed to serve a set of subscribers 206A being connected to the network 202. In the same manner, mobile operators B, C utilise network resources 202B, 202C as illustrated for serving their connected subscribers 206B, 206C, respectively. Of course, certain types of network resources can be used at the same time by more than one operator, such as some base station equipment, and the shown utilised network resources 202A-C may thus partly overlap. In principle, any resources in the whole network 202, more or less, are generally available for the operators to utilise. It should be noted that the subscribers 206A, 206B, 206C can preferably be served at any location within the geographical coverage of network 202, regardless of which operator 200A, 200B or 200C they belong to. However, the present invention does not exclude operators having differentiated geographical coverage, which may be dictated by means of agreement with the network supervisor 204.

The network supervisor 204 will then charge each operator 200A, 200B and 200C for all the network resources that have been "consumed" for their subscribers, e.g. on a regular basis. As mentioned above, the network supervisor may charge the operators for used network resources on the basis of communicated data amounts, used bandwidth and/or connection time, which can be constantly measured in the network 202.

The network supervisor may also supply call records or the like to the operators, containing information on how much each subscriber has consumed in terms of communicated data amounts and/or connection time. In turn, operators 200A, 200B and 200C will individually charge their subscribers 206A, 206B, 206C, respectively, for any services obtained. The skilled person will readily understand that any suitable arrangement for charging subscribers for services may be employed, and the present invention is not limited in this respect.

Figure 2:
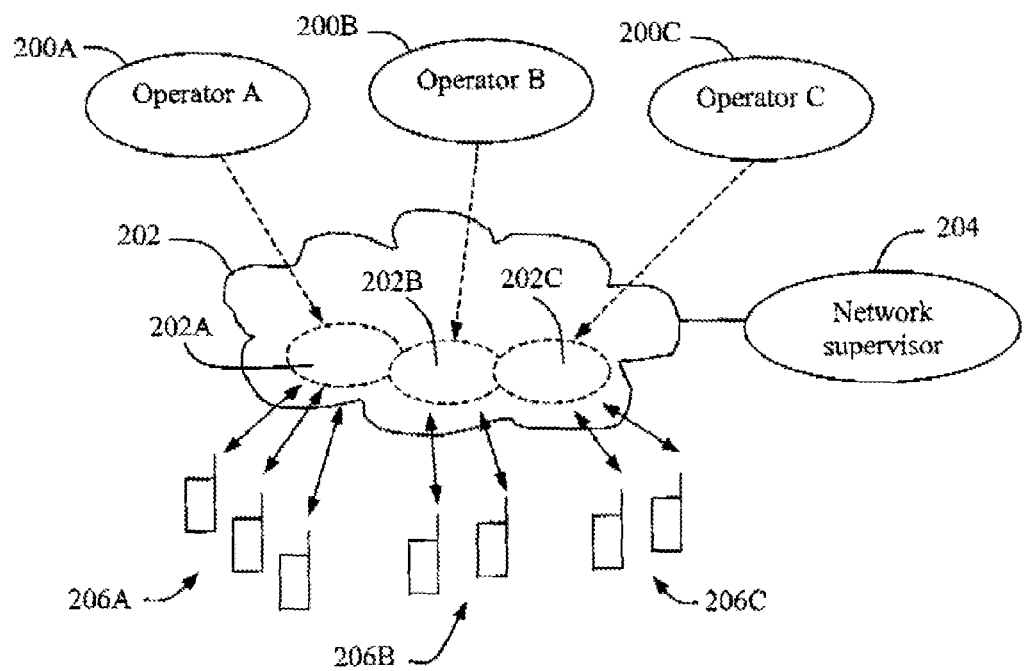
FIG. 2 is a basic overview of a communication scenario, in accordance with the present invention.
Figure 3:
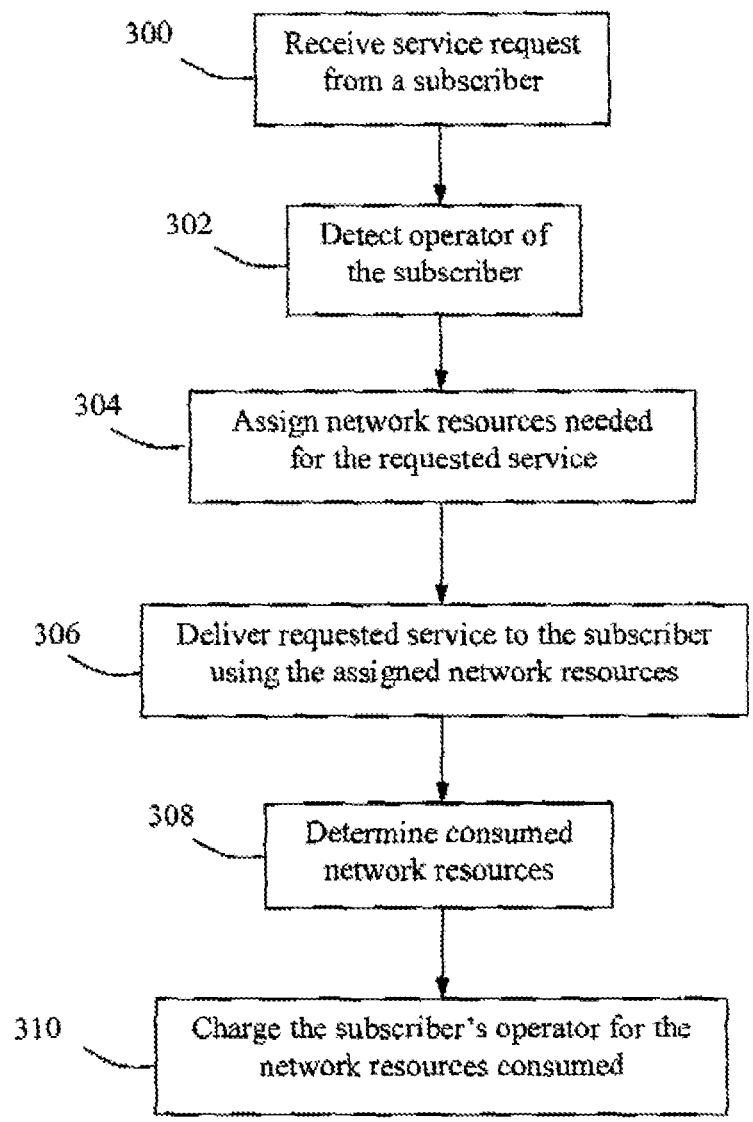
FIG. 3 is a flow chart illustrating a procedure for generally providing communication services for subscribers, in accordance with the present invention.

In accordance with another aspect of the present solution, FIG. 3 is a flow chart illustrating a series of basic steps performed by a network supervisor, e.g. network supervisor 204 in the example of FIG. 2, when generally providing communication services for subscribers. In a first step 300, a service request is generally received from a subscriber, e.g. in the form of a registration request, a call request, a content delivery request, etc.

In a next step 302, the identity of the operator to which the subscriber belongs is detected, which should be indicated in the received request above in a suitable manner, depending on the communication protocol used.

In a next step 304, any network resources needed to fulfil the requested service are assigned in the network, e.g. in terms of bandwidth, radio channels, transmission links, transceiver capacity, etc.

In a next step 306, the requested service is generally delivered to the subscriber, e.g. in the form of a voice call connection, transmission of a short text message or other media, or delivery of some desired content, etc., using the assigned network resources. Thus, "service delivery" should be understood broadly in this context.

In a following step 308, the amount of network resources consumed for the subscriber during the service delivery in step 306, is determined after completing the service delivery. In addition, suitable information regarding the delivered service is stored for use in connection with establishing a call record for the subscriber.

In a final illustrated step 310, the identified operator of the subscriber is charged in a suitable manner for the network resources consumed during service delivery, as determined in step 308 above. Thereby, the operator is charged on the basis of consumed network resources which are thus hired on demand, i.e. only when needed for fulfilling service requests. Of course, the operator may be charged on a regular basis for accumulated resource usage, as measured by the network, or when the resource usage exceeds a predetermined limit, or similar.

It should be noted that the step 302 of identifying of the operator can basically be executed at any time between steps 300 and 308. The above-described procedure may of course involve further routines such as authenticating the subscriber towards the operator, being subject to any prevailing standards and agreements beyond the general scope of the present invention.

Charging the operator for hired network resources can be executed in many different ways. By way of example, the operator charges may generally be divided into plural fees: a fixed fee regardless of used network resources, generally matching the financial investments made in the network, e.g. as loans from financial institutes or the like; a base fee matching the utilised services and/or consumed network resources; and an added "traffic fee" matching the overall traffic in the network. The latter fee may go to equity holders as a profit part for their investments. As mentioned above, financing the network may be shared by various stake holders and equity holders such as commercial banks, financial institutions, manufacturers, local investors, charity institutions, development agencies etc.

By means of the present invention as described above, a single communication network can be used for offering telecommunication services from multiple operators. Thereby, the costs for establishing and maintaining telecommunication services chiefly in rural and/or poor regions can be reduced by avoiding unnecessary duplication of network components and resources. The incentive for operators to enter markets in such regions may thus be greater since they can avoid huge investments in network resources and share the economical risks with others, thus generally improving the business case. Moreover, the tariffs can be kept quite low for rudimentary services, at least to begin with, which will facilitate the establishment of telecommunication in initially weak markets with a poor population. Thereby, the communication traffic can become significant in a relatively short time which will also promote the economical development in general.

In the case of a mobile or cellular network, since only one license or permit is required for radio transmission in a relatively wide frequency band from the local authorities to cater for multiple operators, the overall capacity and efficiency in the single network can be greater, as compared to having multiple separate networks with individual licenses or permits of narrower frequency bands. This provides more freedom for obtaining an efficient network in terms of frequency and cell planning, tuning, topology and coordination.

Generally speaking, a single network can be made more efficient in terms of capacity and costs than a plurality of separate networks altogether. The environmental impact can also be minimised. By way of example, it can be a great advantage, particularly in rural areas, that the power supply is shared by this arrangement, e.g. by means of batteries supported by generators which may be provided by a local third party. In fact, local enterprises and human resources may be utilised for building the network and its various sites. Furthermore, the fast establishment of an infrastructure for telecommunication will promote the general public safety as well as national security and defence.

While the invention has been described with reference to specific exemplary embodiments, the description is generally only intended to illustrate the inventive concept and should not be taken as limiting the scope of the invention, which is defined by the appended claims.

The invention claimed is:

1. A method of providing telecommunication services for subscribers of multiple different operators, using a single communication network comprising network resources and being controlled by an operator-independent network supervisor, wherein the network resources comprise different physical and human resources, and wherein said operators handle subscriptions and sell the services, and said network supervisor controlling the network by managing the different physical and human resources in the network needed to technically provide the services, comprising the operator-independent network supervisor performing the following steps:

receiving a service request from a subscriber;
identifying the operator to which the subscriber belongs;
the operator-independent network supervisor dynamically assigning those ones of the network resources needed for the requested service on a service delivery or call basis, wherein any of the network resources in said communication network are available for all the operators to utilize;

delivering the requested service for the subscriber using the assigned network resources;

determining the amount of network resources consumed for the subscriber during the service delivery, after each service delivery or call; and charging the identified operator of the subscriber for the network resources consumed during the service delivery.

2. The method according to claim 1, wherein the operators are charged for consumed network resources on the basis of communicated data amounts, used bandwidth, and/or connection time.

3. The method according to claim 1, comprising a further step of supplying call records to the operators, containing information on how much each subscriber has consumed in terms of communicated data amounts and/or connection time.

4. The method according to claim 1, wherein said service request involves any of: a voice call, a text message, content delivery, multimedia communication and Internet applications.

5. The method according to claim 1, wherein said assigned network resources include any hardware, software and/or human resources needed for the requested service.

6. An arrangement for providing telecommunication services to subscribers of multiple different operators, using a single communication network comprising network resources and being controlled by an operator-independent network supervisor, wherein the network resources comprise different physical and human resources, and wherein said operators handle subscriptions and sell the services, and said network supervisor controlling the network by managing the different physical and human resources in the network needed to technically provide the services, comprising:

a receiving unit of the operator-independent operator configured to receive a service request from a subscriber;

an identifying unit of the operator-independent operator configured to identify the operator to which the subscriber belongs;

an assigning unit in the operator-independent network supervisor, the assigning unit being configured to dynamically assign network resources needed for the requested service on a service delivery or call basis, wherein any resources in said communication network are available for all the operators to utilize;

a service delivery unit of the operator-independent operator configured to deliver the requested service for the subscriber using the assigned network resources;

a resource consumption determination unit of the operator-independent operator configured to determine the amount of network resources consumed for the subscriber during the service delivery, after each service delivery or call; and a charging unit of the operator-independent operator configured to charge the identified operator of the subscriber for the network resources consumed during the service delivery.

7. The arrangement according to claim 6, wherein said charging unit is adapted to charge the operators for consumed network resources on the basis of communicated data amounts, used bandwidth, and/or connection time.

8. The arrangement according to claim 6, further comprising a call record supplying unit configured to supply call records to the operators, containing information on how much each subscriber has consumed in terms of communicated data amounts and/or connection time.

9. The arrangement according to claim 6, wherein said service request involves any of: a voice call, a text message, content delivery, multimedia communication and Internet applications.

10. The arrangement according to claim 6, wherein said network resources include any of: hardware, software and human resources.

11. The arrangement according to claim 6, wherein said communication network is a mobile or cellular network according to any of: GSM (Global Systems for Mobile communication), GPRS (General Packet Radio Service) or WCDMA (Wideband Code Division Multiple Access).

12. The arrangement according to claim 6, wherein said communication network is a fixed broadband access network, a WLAN (Wireless Local Area Network), or a PSTN (Public Switched Telephony Network).

13. An arrangement for controlling a communication network by an operator-independent network supervisor, in order to provide telecommunication services to subscribers of multiple different operators, said operators handling subscriptions and selling the services, the arrangement comprising:

said operator-independent network supervisor comprising a management unit that controls the network by managing different physical and human resources in the network needed to technically provide the services, wherein resources in said network needed for requested services are dynamically hired out by the operator-independent network supervisor to said operators on a service delivery or call basis in order to serve their subscribers, any resources in said communication network being available for all the operators to utilize, and the operator-independent network supervisor further comprising a charging unit that charges the operators for network resources consumed during service delivery to their subscribers, wherein the charging unit that charges the operators determines, after each service delivery or call, the amount of network resources consumed during service delivery to the subscribers.

14. The arrangement according to claim 13, adapted to hire out said network resources to said operators on the basis of communicated data amounts, used bandwidth, and/or connection time.

15. A method of controlling a communication network by an operator-independent network supervisor, in order to provide telecommunication services to subscribers of multiple different operators, said operators handling subscriptions and selling the services, the method comprising:

said network supervisor controlling the network by performing:

managing different physical and human resources in the network needed to technically provide the services, wherein resources in said network needed for requested services are dynamically hired out by the operator-independent network supervisor to said operators on a service delivery or call basis in order to serve their subscribers, any resources in said communication network being available for all the operators to utilize, and charging the operators for network resources consumed during service delivery to their subscribers, wherein the amount of network resources consumed during service delivery to the subscribers is determined after each service delivery or call.

16. The method according to claim 15, wherein said network resources are hired out to said operators on the basis of communicated data amounts, used bandwidth, and/or connection time.

* * * * *